US006628570B2

United States Patent
Ruffa

(10) Patent No.: US 6,628,570 B2
(45) Date of Patent: Sep. 30, 2003

(54) LASER VELOCIMETRY DETECTION OF UNDERWATER SOUND

(75) Inventor: Anthony A. Ruffa, Hope Valley, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/932,724

(22) Filed: Aug. 20, 2001

(65) Prior Publication Data

US 2003/0072219 A1 Apr. 17, 2003

(51) Int. Cl.[7] .............................. H04R 1/44
(52) U.S. Cl. ...................... 367/149; 367/902
(58) Field of Search ................ 367/89, 149, 902, 367/128; 356/28.5

(56) References Cited

U.S. PATENT DOCUMENTS

| | | | | |
|---|---|---|---|---|
| 4,998,225 A | * | 3/1991 | Shajenko | 367/149 |
| 5,379,270 A | * | 1/1995 | Connolly | 367/128 |
| 5,504,719 A | * | 4/1996 | Jacobs | 367/149 |
| 5,610,704 A | * | 3/1997 | Berzins et al. | 356/28.5 |
| 5,734,623 A | * | 3/1998 | Ruffa | 367/128 |

OTHER PUBLICATIONS

Bucknell et al.; A Novel Method for Optical Bubble–Sizing; Jul. 1994; IEE Conference Publication No. 394; pp. 141–147.*

* cited by examiner

Primary Examiner—Daniel T. Pihulic
(74) Attorney, Agent, or Firm—James M. Kasischke; Jean-Paul A. Nasser; Michael F. Oglo

(57) ABSTRACT

An apparatus for determining the velocity of sound waves which includes a liquid medium having a plurality of gas bubbles. In the liquid medium, a laser transmits a light pulse to interact with the bubbles excited by the sound wave. Backscattered light from the interaction of the light pulse is received. A processor is then responsive to the detector to provide detection of the acoustic wave through the fluid medium.

14 Claims, 2 Drawing Sheets

LASER VELOCIMETRY DETECTION OF UNDERWATER SOUND

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates to acoustic wave systems and more particularly to means for detecting of acoustic waves by means of electromagnetic radiation.

(2) Brief Description of the Prior Art

The detection and measurement of sound using lasers is well known. Essentially, a light beam is caused to pass through a medium, which may be air or water, and detect and process reflections from particles in the medium. These particles will tend to have approximately the same velocity as the particle velocity associated with an acoustic plane wave propagating through the medium. The particle velocity for the plane wave is $P/(\rho_o c)$, where P is the pressure amplitude, $\rho_o$ is the density and c is the speed of the sound in the medium. The elapsed time and the Doppler shift of the reflected beam indicate the locations and velocity of the scattering particle. This method is known as laser Doppler velocimetry and is reviewed by Vignola et al. *J. Acoust. Soc. Am.* 90, 1275–1286, 1991. It has even been envisioned to create a "virtual array" by processing multiple returns from a single beam and then appropriately delaying them to achieve a gain against noise.

Various patents describe means for making use of light to measure properties of acoustic waves. U.S. Pat. No. 4,998,225 to Shajenko, for example, discloses a dual beam hydrophone wherein a reference laser beam and a signal laser beam are both modulated simultaneously by the movement of reflecting surfaces responding to pressure variations due to an impinging acoustic wave. Each beam, travels the same path length within the hydrophone before being detected, thus eliminating any otherwise needed signal compensation. The reference beam and signal beam are acoustically modulated 180° out of phase which reduces by one half the number of reflections normally required to produce the same sensitivity.

U.S. Pat. No. 5,379,270 to Connolly discloses an apparatus and method for determining the velocity of sound propagation in a fluid as a function of position in the fluid along an axis. A wave of acoustic energy is transmitted along the axis to produce a disturbance that moves in the medium at the velocity of sound. A laser generator transmits a light pulse substantially along the axis through the fluid medium. As the light passes through the disturbance, light backscatters in a characteristic pattern that a detector senses for analysis to provide information concerning the distance traveled and the time of travel for the acoustic wave through the fluid medium and to provide a profile of output characteristic, such as the speed of sound in the medium, as a function of position in the medium.

U.S. Pat. No. 5,504,719 to Jacobs discloses a system in which a hydrophone employs a laser beam which is focused upon a small "focal" volume of water in which natural light scattering matter is suspended and which matter vibrates in synchronism with any sonic waves present. The vibration produces a wave modulation of the scattered light, which may be recovered by optical heterodyne and sensitive phase detection techniques. The sonic waves are sensed at locations displaced from the focusing lenses. Because of this remote sensing capability, the physical hardware of an array of hydrophones may be confined to a small area comparable to the dimensions of the lenses themselves while the sensing of the sonic waves virtually occurs at widely spaced, remote focal volumes. Thus, by combining the signals from these remote focal volumes, a virtual array of hydrophones may be formed whose dimensions are large enough in relation to the sonic wavelengths of interest to achieve high directionality but without the penalties of hydrodynamic drag usually associated with large area arrays.

U.S. Pat. No. 5,610,704 to Berzins et al. discloses a probe which directs a light beam through a vapor plume in a first direction at a first angle ranging from greater than 0° to less than 90°, reflecting the light beam back through the vapor plume at a 90° angle, and then reflecting the light beam through the vapor plume a third time at a second angle equal to the first angle, using a series of mirrors to deflect the light beam while protecting the mirrors from the vapor plume with shields. The velocity, density, temperature and flow direction of the vapor plume may be determined by a comparison of the energy from a reference portion of the beam with the energy of the beam after it has passed through the vapor plume.

It will be appreciated that the measurement of same particle velocity is more effective in air than in water. The reason for this is that the ratio of the specific acoustic impedance, for the two mediums in approximately 4000. Therefore, the particle velocity of a scatterer will be 4000 times greater in air, leading to a much greater sensitivity. In water, Vignola et al. conducted experiments with standing waves that led to an estimate that particle displacements of 5 nm were detectable with this method. This is equivalent to a sound pressure level of 156 dB re: 1 $\mu$Pa at a frequency of 1809 Hz.

SUMMARY OF THE INVENTION

It is an object of the present invention to improve the efficiency of the measurement of the velocity of sound waves in a liquid medium by using lasers.

This invention makes use of a unique feature of water, i.e., entrained bubbles, to increase the Doppler shift of a scatterer by approximately three orders of magnitude.

Considering a single bubble in water, its resonant frequency $f_0$ is given by:

$$f = \frac{1}{2\pi a}\sqrt{\frac{3\gamma P_o}{\rho_0}} \quad (1)$$

where a is the radius of the bubble, $\gamma$ is the ratio of specific heats of the air in the bubble (~1.4), $P_o$ is the steady-state pressure and $\rho_o$ is the density. Thus, a 1-mm radius bubble in water has a resonant frequency of approximately 3300 Hz. The amplitude of radial velocity of such a bubble at resonant frequency $f_0$ is given by:

$$U_0 = \frac{4\pi a^2 P_i}{Z_m} \quad (2)$$

At resonance $Z_m = R_m + R_r$, where $R_r = 4\pi a^2 \rho_o c(ka)^2$, and $R_m \sim (1.6 \times 10^{-4})(4\pi a^3 \rho_o)(2\pi f_0)^{1/2}$. For the above bubble, the velocity amplitude is $3.49 \times 10^{-3} P_i$, compared to $6.7 \times 10^{-7} P_i$ for a plane wave in water. The velocity ratio is estimated to be 5200 or a 74 dB change on a sound pressure level basis. The above radial velocity is actually the same order of magnitude as the particle velocity associated with a plane wave propagating in air.

Another factor applicable to this invention is that detectability improves with optical scattering strength, which increases with particle size. Bubbles are often much larger than microparticles normally used for scattering. For example, bubbles may be about 1 mm which in turn, microparticles may be 0.01–10 $\mu$m.

In the present invention, it will be appreciated that the measurement of same particle velocity is more effective in air than in water. The reason for this is that the ratio of the specific acoustic impedance, for the two mediums in approximately 4000. Therefore, the particle velocity of a scatterer will be 4000 times greater in air, leading to a much greater sensitivity. In water, Vignola et al. conducted experiments with standing waves that led to an estimate that particle displacements of 5 nm were detectable with this method. This is equivalent to a sound pressure level of 156 dB re: 1 $\mu$Pa at a frequency of 1809 Hz.

The presence of such a bubble therefore greatly improves the practicality of laser Doppler velocimetry detection of sound in water. The present invention makes use of this effect in two primary ways. The first way consists of directing multiple beams in the region near the water surface where most bubbles reside. The reflections from bubbles would be appropriately delayed and summed, effectively forming a virtual volumetric array.

The second way of improving detection of sound in water using laser Doppler velocimetry involves a towed array consisting of a gel-filled hose containing bubbles with a radius distribution having an appropriate mean and variance for the frequency band of interest. The bubbles would respond to an incident sound filed and a laser inside the hose would simultaneously illuminate them.

The gel and bubble radii distribution is selected such that the desired resonant frequency band is maintained at the towed array depth range causing compression of the bubbles. Such a towed array has the potential to achieve a good sensitivity in a compact hose.

In the present invention, an apparatus is provided for measuring the velocity of a wave of acoustic energy in a given bandwidth along an axis. In the liquid medium, a laser transmits a light pulse to interact with the sound wave. Backscattered light from the interaction of the light pulse is received. A processor is then responsive to the detector to determine a distance traveled and time of travel for the acoustic wave through the fluid medium.

BRIEF DESCRIPTION OF THE DRAWINGS

Other objects, features and advantages of the present invention will become apparent upon reference to the following description of the preferred embodiments and to the drawing, wherein corresponding reference characters indicate corresponding parts in the drawing and wherein.

DESCRIPTION OF THE PREFERRED EMBODIMENT

Figure 1:
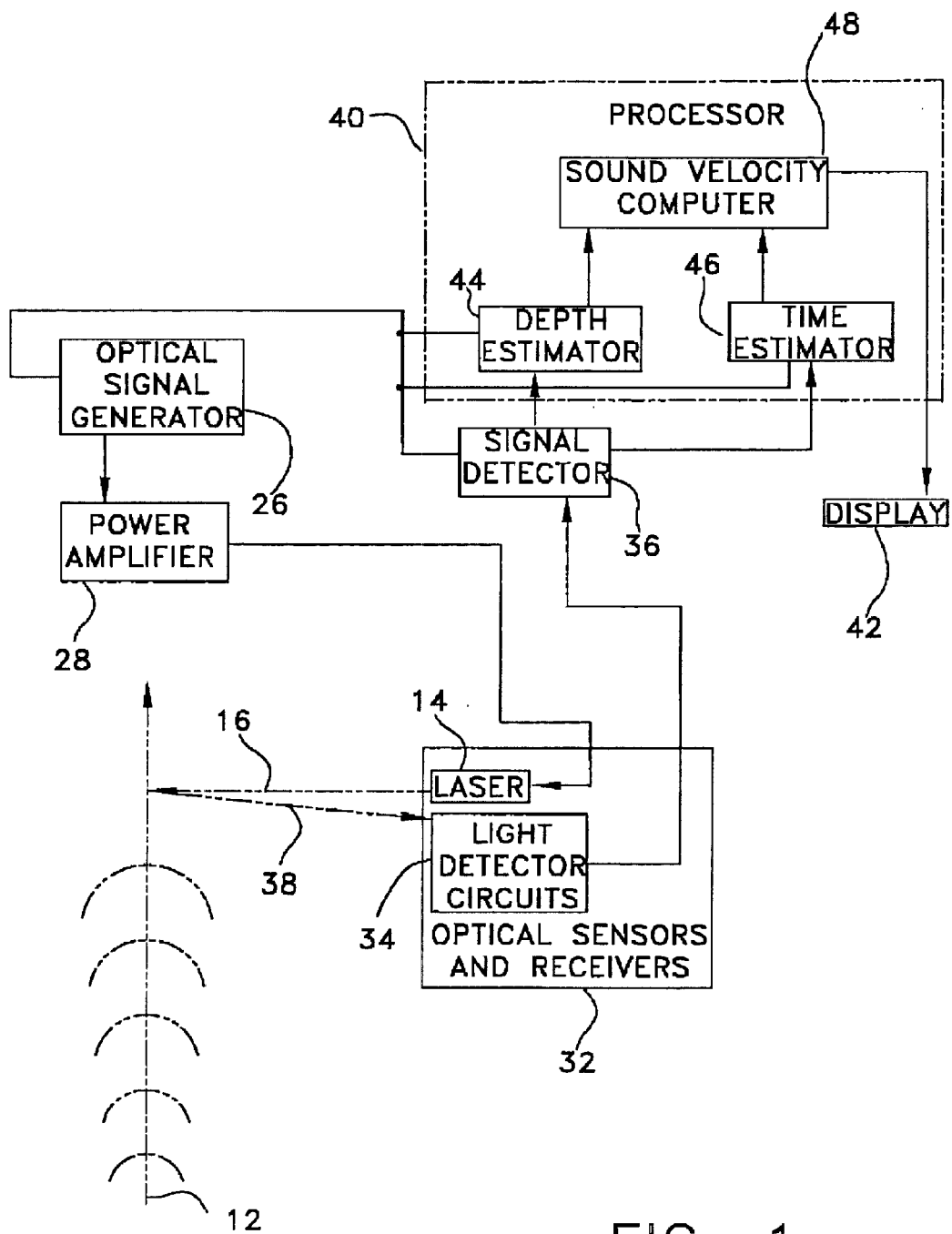
FIG. 1 is a schematic representation of the components of the laser source and receiver employed in the apparatus of present invention.

Referring to FIG. 1, a sound velocity profiler is constructed in accordance with this invention. Laser 14 transmits a light pulse along the laser pulse axis 16. The laser pulse axis 16 passes through the acoustic field. Thus, this circuitry responds to the backscatter from predetermined positions within the acoustic field. The acoustic field at that position would modulate the backscatter light at any such position.

An optical signal generator 26 generates a signal that power amplifier 28 amplifies to enable a laser to fire along laser pulse axis 16.

Optical sensors and receivers 32 that include light detector circuits 34 and a signal detector 36, receive and analyze the backscattered light 38 using conventional processing techniques to provide input signals to a processor 40 that determines the distance traveled and the time of travel for the acoustic wave through the medium for visual presentation on display 42 or other output device. More specifically, the processor 40 includes a depth estimator 44 and a time estimator 46. The depth estimator 44 uses the arrival time provided by the signal detector 36 and the clock pulse information representing the transmission of a laser pulse to determine the round trip time and estimate the depth of the wave front while a time estimator provides a corresponding time value. A sound velocity computer 48 in the processor 40 combine signals from the estimators 44 and 46 according to equation (1) to provide an output on a sound velocity profile display 42.

Figure 2:
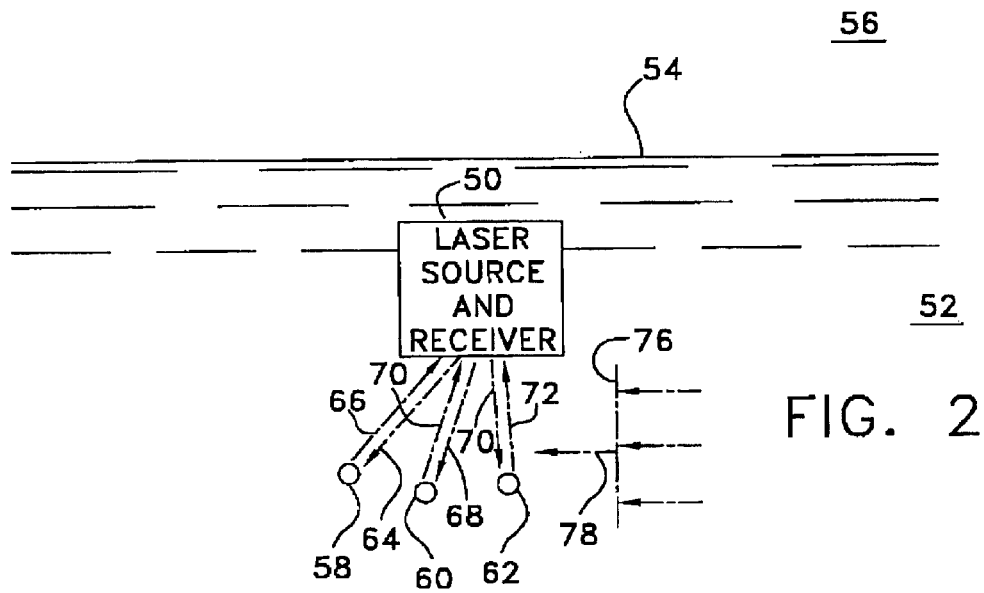
FIG. 2 is a schematic representation of a preferred embodiment of the apparatus of the present invention.

Referring to FIG. 2, one embodiment of the present invention includes a laser source and receiver apparatus 50, as was described combined in connection with either FIG. 1. This laser source and receiver apparatus 50 is positioned in a body of water 52 which has an upper water line 54 that separates the water 52 from atmosphere 56. Within the water adjacent the surface water line 54 there are a plurality of bubbles 58, 60 and 62. Transmitted from the laser source and receiver apparatus 50 there is a laser beam 64, which is reflected from bubble 58 in reflection 66. Transmitted from laser source and receiver apparatus 52 at an angle from laser beam 64 there is a laser beam 68 which is reflected from bubble 60 in reflection 70. At a still additional angler displacement there is laser beam 72, which is transmitted from the laser source and receiver apparatus 50 and is reflected from bubble 62 in reflection 74, which is received by the laser source and receiver apparatus. There is an acoustic plane wave 76 with axis 78 that moves through the positions of the bubbles 58, 60 and 62, to cause these bubbles to resonate. This resonation is detected when the laser source and receiver apparatus 50 receive the reflection 66, 68 and 70 from respectably from bubbles 58, 60 and 62. By measuring the amount of time which the acoustic plane wave 76 takes to progress from bubble 62 to bubble 60 and then to bubble 58, the velocity of the acoustic plane wave 76 is calculated at the laser source and receiver 50.

Figure 3:
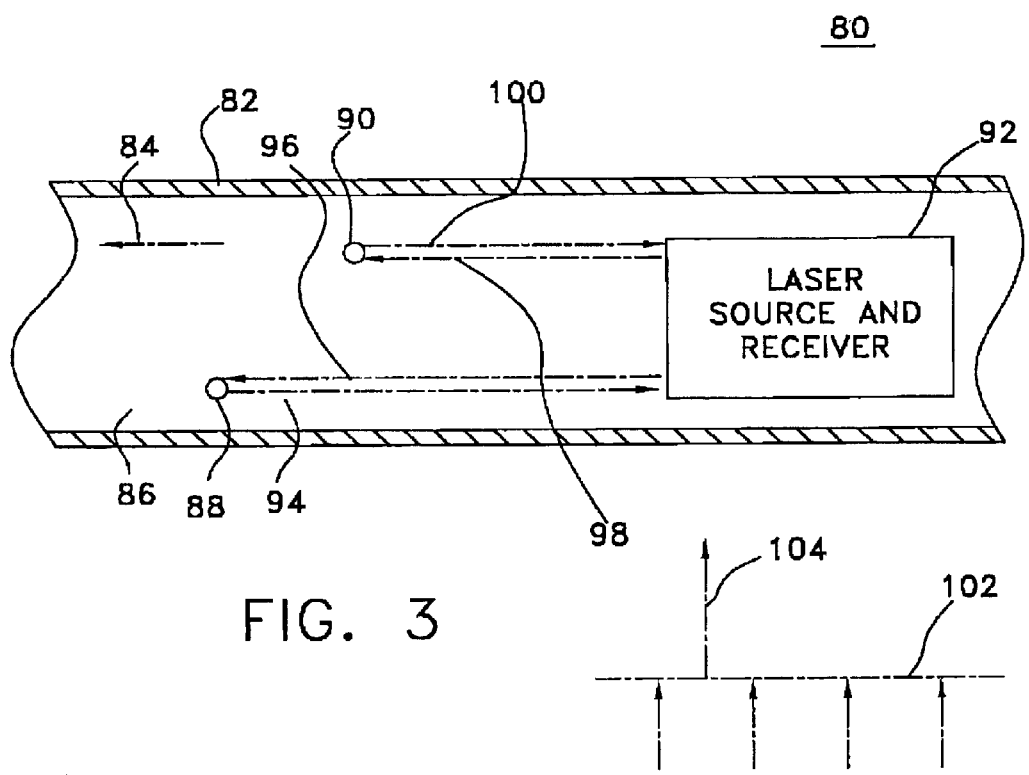
FIG. 3 is a schematic representation of an alternate preferred embodiment of the apparatus of the present invention.

Referring to FIG. 3, another embodiment is shown in which the apparatus is submerged in water 80 and includes an elongated vessel 82 having a longitudinal axis 84 and which is filled with a gel 86 having a plurality of bubbles as at bubble 88 and 90 therein. A laser source and receiver apparatus 92 as was described above in conjunction in connection with either FIG. 1 is positioned at one end of the elongated vessel 82. Laser beam 94 is generated by the laser source and receiver apparatus 92 and is reflected by bubble 88 in reflection 96 which is received at the laser source and receiver apparatus 82. Laser beam 98 is generated by the laser source and receiver apparatus 92 and is reflected from bubble 90. Reflection 100 is then received by the laser source and receiving apparatus 92. There is also an acoustic plane wave 102 having an axis 104, which moves transversely with respect to the longitudinal axis 84 of the elongated vessel 82. This acoustic plane wave 102 causes bubbles as at bubble 88 and 90 in the gel 86 to resonate as a wave passes them. Since the bubbles 88 and 90 are transversely displaced from each other in the elongated vessel 82 the velocity of the acoustic plane wave 102 may be determined by measuring the time that it takes the wave to progress from bubble 88 to bubble 90.

The presence of such bubbles therefore greatly improves the practicality of laser Doppler velocimetry detection of sound in water. The present invention makes use of this effect in two primary ways. The first way consists of directing multiple beams in the region near the water surface where most bubbles reside. The reflections from bubbles would be appropriately delayed and summed, effectively forming a virtual volumetric array.

The second way involves a towed array consisting of a gel-filled hose containing bubbles with a radius distribution having an appropriate mean and variance for the frequency band of interest. The bubbles would respond to an incident sound filed and a laser inside the hose would simultaneously illuminate them (the gel is selected such that the desired resonant frequency band is maintained at the towed array depth causing compression of the bubbles. Such a towed array has the potential to achieve a good sensitivity in a compact hose.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An apparatus for detecting sound waves in a given bandwidth along an axis comprising:

a liquid medium having a plurality of gas bubbles;

laser generating means for transmitting a light pulse interacting with said wave of acoustic energy;

detector means for receiving backscattered light from the interaction of the light pulse and the bubbles excited by the wave of acoustic energy, the scattered light being in a bandwidth that includes the given bandwidth of the acoustic energy;

processing means responsive to said detector means for determining a distance traveled and time of travel for the acoustic wave through the fluid medium; and control means for synchronizing the operations of said laser generator means, said detector means and said processing means.

2. The apparatus as recited in claim 1 wherein said processing means includes distance estimating means and time estimating means responsive to the interval between the transmission of a light pulse and the receipt of the back-scattered light for providing information related to the distance along the axis to the disturbance and the time of the light pulse on a repeated basis.

3. The apparatus of claim 2 wherein said laser generator means includes optical signal generator means for generating a light pulse in response to signals from said control means, amplifier means for amplifying the light pulse and for directing the amplified light pulse into the fluid medium along the axis.

4. The apparatus of claim 2 additionally including means for displaying the measured parameter as a function of position along the axis.

5. The apparatus of claim 1 wherein the liquid medium is water.

6. The apparatus of claim 1 wherein the gas bubbles are air.

7. The apparatus of claim 1 wherein the liquid medium has a surface and the gas bubbles are adjacent said surface.

8. The apparatus of claim 1 wherein a gel is submerged in the liquid medium and the gas bubbles are in said gel.

9. An apparatus for detecting sound waves in a given bandwidth along an axis comprising:

a first liquid medium;

a second medium having a plurality of gas bubbles therein and said second medium having a longitudinal axis in intersecting relation to the axis of the wave of acoustic energy;

laser generating means for transmitting a light pulse;

detector means for receiving scattered light from the interaction of a light pulse and the bubbles excited by the wave of acoustic energy, the scattered light being in a bandwidth that includes the given bandwidth of the acoustic energy;

processing means responsive to said detector means for determining a distance traveled and time of travel for the acoustic wave through the fluid medium; and control means for synchronizing the operations of said laser generator means, said detector means and said processing means.

10. The apparatus of claim 9 wherein the first liquid medium is water.

11. The apparatus of claim 9 wherein the gas bubbles are air.

12. The apparatus of claim 9 wherein the second medium is substantially transparent.

13. The apparatus of claim 9 wherein the second medium is a gel.

14. A method for detecting and determining the characteristics of sound waves in a liquid medium comprising the steps of causing a light pulse to interact with said sound wave and obtain detection, wherein the improvement comprises providing a plurality of gas bubbles in said liquid medium and measuring the radial velocity of the walls of the gas bubbles.

* * * * *